United States Patent
Natarajan et al.

(10) Patent No.: US 9,330,332 B2
(45) Date of Patent: May 3, 2016

(54) FAST COMPUTATION OF KERNEL DESCRIPTORS

(71) Applicant: Raytheon BBN Technologies Corp., Cambridge, MA (US)

(72) Inventors: Pradeep Natarajan, Cambridge, MA (US); Shuang Wu, Cambridge, MA (US); Rohit Prasad, Acton, MA (US); Premkumar Natarajan, Sudbury, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 99 days.

(21) Appl. No.: 14/046,194

(22) Filed: Oct. 4, 2013

(65) Prior Publication Data

US 2014/0099033 A1   Apr. 10, 2014

Related U.S. Application Data

(60) Provisional application No. 61/710,355, filed on Oct. 5, 2012.

(51) Int. Cl.
   *G06K 9/56* (2006.01)
   *G06K 9/46* (2006.01)
   *G06K 9/62* (2006.01)

(52) U.S. Cl.
   CPC .......... *G06K 9/4633* (2013.01); *G06K 9/6247* (2013.01)

(58) Field of Classification Search
   USPC ......... 382/154, 190, 205, 282, 305, 107, 209; 358/419, 664
   See application file for complete search history.

(56) References Cited

U.S. PATENT DOCUMENTS 7,310,720 B2 * 12/2007 Cornett ................ G05B 19/056
                                                    711/115
7,787,678 B2 *  8/2010 Unal ...................... G06T 7/0012
                                                    382/128

(Continued)

OTHER PUBLICATIONS

Bo et al., "Kernel Descriptors for Visual Recognition," Neural Information Processing Systems, Dec. 6, 2010.

(Continued)

*Primary Examiner* — Yosef Kassa
(74) *Attorney, Agent, or Firm* — Daly, Crowley, Mofford & Durkee, LLP

(57) ABSTRACT

An approach to computation of kernel descriptors is accelerated using precomputed tables. In one aspect, a fast algorithm for kernel descriptor computation that takes O(1) operations per pixel in each patch, based on pre-computed kernel values. This speeds up the kernel descriptor features under consideration, to levels that are comparable with D-SIFT and color SIFT, and two orders of magnitude faster than STIP and HoG3D. In some examples, kernel descriptors are applied to extract gradient, flow and texture based features for video analysis. In tests of the approach on a large database of internet videos used in the TRECVID MED 2011 evaluations, the flow based kernel descriptors are up to two orders of magnitude faster than STIP and HoG3D, and also produce significant performance improvements. Further, using features from multiple color planes produces small but consistent gains.

9 Claims, 1 Drawing Sheet

(56) References Cited

U.S. PATENT DOCUMENTS

| | | | |
|---|---|---|---|
| 7,860,874 B2 * | 12/2010 | Karklins | G05B 19/05 700/83 |
| 7,881,878 B2 * | 2/2011 | Burrus | G01R 33/56341 600/410 |
| 8,313,437 B1 * | 11/2012 | Suri | 600/443 |
| 8,369,967 B2 * | 2/2013 | Hoffberg et al. | 700/80 |
| 8,516,266 B2 * | 8/2013 | Hoffberg et al. | 713/189 |
| 8,805,653 B2 * | 8/2014 | Huh et al. | 703/2 |

OTHER PUBLICATIONS

Bo et al., "Object Recognition with Hierarchical Kernel Descriptors," Computer Vision and Pattern Recognition (CVPR), IEEE Conference ON, IEEE, Jun. 20, 2011.

Ren et al., "RGB-(D) Scene Labeling: Features and Algorithms," Computer Vision and Pattern Recognition (CVPR), IEEE Conference ON, IEEE, Jun. 16, 2012.

Reubold et al., Kernel Descriptors in Comparison with Hierarchical Matching Pursuit, Robot Learning Seminar, Jul. 1, 2012.

* cited by examiner

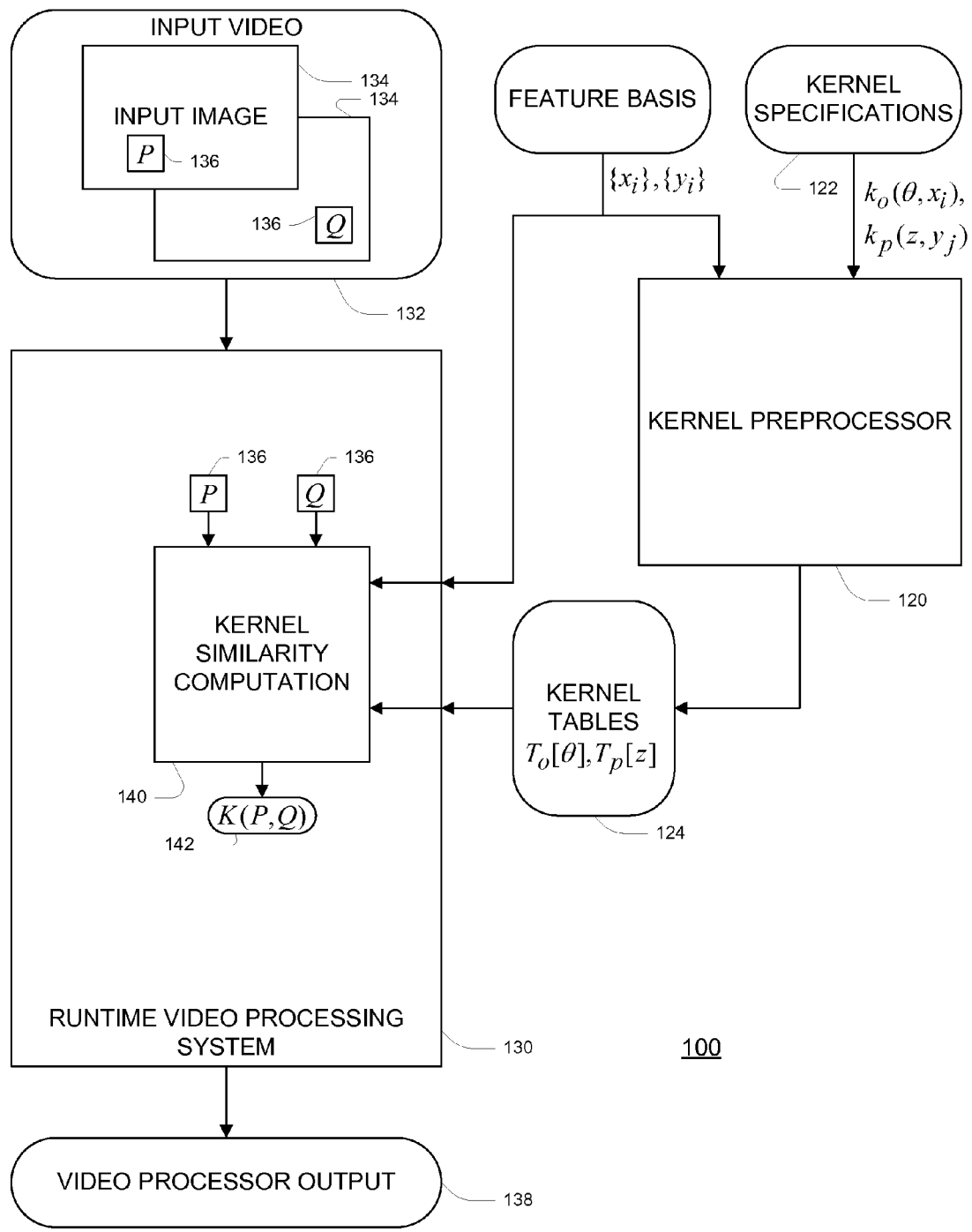

FAST COMPUTATION OF KERNEL DESCRIPTORS

CROSS-REFERENCE TO RELATED APPLICATIONS

This application claims the benefit of U.S. Provisional Application No. 61/710,355, filed on Oct. 5, 2012, which is incorporated herein by reference.

STATEMENT AS TO FEDERALLY SPONSORED RESEARCH

This invention was made with government support under D11PC20071 awarded by IARPA. The government has certain rights in the invention.

BACKGROUND

This invention relates to computation of kernel descriptors, and in particular to fast matching of image patches using fast computation of kernel descriptors.

The widespread availability of cheap hand-held cameras and video sharing websites has resulted in massive amounts of video content online. The ability to rapidly analyze and summarize content from such videos entails a wide range of applications. Significant effort has been made in recent literature to develop such techniques. However, the sheer volume of such content as well as the challenges in analyzing videos introduce significant scalability challenges, for instance, in applying successful "bag-of-words" approaches used in image retrieval.

Features such as STIP and HoG3D that extend image level features to the spatio-temporal domain have shown promise in recognizing actions from unstructured videos. These features discretize the gradient or optical flow orientations into a d-dimensional indicator vector $\delta(z)=[\delta_1(z), \ldots, \delta_d(z)]$ with $$\delta_i(z) = \begin{cases} 1 & \text{if } \left\lfloor \frac{d\theta(z)}{2\pi} \right\rfloor = i - 1 \\ 0 & \text{otherwise} \end{cases}$$

Despite their success, these features are generally hand designed and do not generally utilize full information available in measuring patch similarity. In recent work, several efforts have been made to develop principled approaches to design and learn such low-level features. For example, a convolutional GRBM method has been proposed to extract spatio-temporal features using a multi-stage architecture. Also, a convolutional independent subspace analysis (ISA) network has been proposed to extract patch level features from pixel attributes.

These deep learning approaches are in effect mapping pixel attributes into patch level features using a hierarchical architecture. A two layer hierarchical sparse coding scheme has been used for learning image representations at the pixel level. An orientation histogram in effect uses a pre-defined d-dimensional codebook that divides the θ space into uniform bins, and uses hard quantization for projecting pixel gradients. Another scheme allows data driven learning of pixel level dictionaries, and the pixel features are projected to the learnt dictionary using sparse coding to get a vector $W(z)=(w_1(z), \ldots, w_d(z))$. After pooling such pixel level projections within local regions, the first layer codes are passed to the second layer for jointly encoding signals in the region. The orientation histograms and hierarchical sparse coding in effect define the following kernel for measuring the similarity between two patches P and Q:

$$K(P, Q) = F_h(P)^T F_h(Q) = \sum_{z \in P} \sum_{z' \in Q} \tilde{m}(z) \tilde{m}(z') \Phi(z)^T \Phi(z')$$

where
  $F_h(P) = \Sigma_{z \in P} \tilde{m}(z) \Phi(z)$ is the patch sum
  $\tilde{m}(z) = m(z)/\sqrt{\Sigma_{z \in P} m(z)^2 + \epsilon_g}$ is the normalized gradient magnitude with $\epsilon_g$ a small constant, and
  $\Phi(z) = \delta(z)$ for HoG and $\Phi(z) = W(z)$ for hierarchical sparse coding.

Kernel descriptors have been proposed to generalize these approaches by replacing the product $\Phi(z)^T \Phi(z')$ above with a match kernel $k(z, z')$ and allows one to induce arbitrary feature spaces $\Phi(z)$ (including infinite dimensional) from pixel level attributes. This provides a powerful framework for designing rich low-level features and has shown state-of-the-art results for image and object recognition.

A significant limitation of kernel descriptors is that kernel computations are generally costly and hence it is slow to extract them from densely sampled video patches.

SUMMARY

In one aspect, in general, a fast algorithm for kernel descriptor computation that takes O(1) operations per pixel in each patch, based on pre-computed kernel values is used. This speeds up the kernel descriptor features under consideration, to levels that are comparable with D-SIFT and color SIFT, and two orders of magnitude faster than STIP and HoG3D. In some examples, kernel descriptors are applied to extract gradient, flow and texture based features for video analysis. In tests of the approach on a large database of internet videos, the flow based kernel descriptors are up to two orders of magnitude faster than STIP and HoG3D, and also produce significant performance improvements. Further, using features from multiple color planes produces small but consistent gains.

In another aspect, in general, a method for image processing makes use of precomputed stored tables (e.g., "kernel sum tables"), which are read. Each kernel table represents a mapping from a corresponding pixel attribute to a vector of values. Images are accepted for processing, and patches are identified within said images. For each patch P, a feature vector is computed based summations of a product of terms over locations z in the patch. Each term within the product is obtained by a lookup in the kernel sum table corresponding to the location z of an attribute of the patch at the location z. The feature vectors thus obtained can then be used for several downstream image/video processing applications, such as similarity computation between two patches P and Q.

In another aspect, in general, a method for image processing makes use of precomputed stored tables (e.g., "kernel sum tables"), which are read. Each kernel table represents a mapping from a corresponding feature to a vector of values. Images are accepted for processing, and patches are identified within said images. The processing includes repeatedly computing similarities between pairs of patches for images being processed. Computation of a similarity between a patch P and a patch Q comprises computing for patch P one or more summations over locations z in the patch P of terms, each term being a product of terms including a term obtained by a lookup in a corresponding kernel table according to the location z and/or an attribute of the patch P at the location z, computing for patch Q one or more summations over locations z in the patch Q of terms, each term being a product of terms including a term obtained by a lookup in a corresponding kernel table according to the location z and/or an attribute of the patch Q at the location z, and combining the sums of the one or more summations for P and one or more summations for Q to determine a kernel descriptor similarity between P and Q. A result of processing the images is determined using the computed similarities between the patches. In some examples, the kernel tables are precomputed prior to accepting the images for processing.

An advantage of the approach is that the computational resources required are greatly reduced as compared to conventional approaches to image/video processing using kernel descriptors.

Other features and advantages of the invention are apparent from the following description, and from the claims.

DESCRIPTION OF DRAWINGS

FIG. 1 is a diagram of a video processing system.

DESCRIPTION

Referring to FIG. 1, a computer implemented video processing system 100 includes a runtime processing system 130, which accepts an input video 132 (e.g., a series of image frames acquired by a camera) and provides a video processor output 138. A wide variety of well-known processing tasks may be performed by this system to produce the output 138. A common feature of such tasks is repeated computation of comparison of patches (e.g., pixel regions) of images of the input video. For example, the input video 132 includes a large number of input images (e.g., video frames) 134. Each input image may have a large number of patches 136. In FIG. 1, a patch P is illustrated in one image and another patch Q is illustrated in another image. It should be understood that although illustrated in terms of patches that are formed as parts of single images, a single patch can also be defined to span multiple frames in a video, for example, to permit use of motion-based features. The runtime processing system 130 includes a computation module 140 that is configured to accept data representing two patches 136 (e.g., P and Q), and to provide a quantity K(P,Q) 142 representing a similarity between the two patches. It should be understood that this similarity computation is repeated a very large number of times, and therefore the computational resources required for this computation may represent a substantial portion of the total resources required to support the runtime system 130. It should be understood that understood that the use of the similarity computation module 140 is presented in the context of a video processing system as an example and that such a module is applicable in other image or video processing systems, and more generally, in other applications in which a similar similarity computation may be used.

One approach to similarity computation is based on a kernel representation approach. In the discussion below, an example with two kernels, one associated with orientation and one associated with position is presented. However, it should be understood that the approach is applicable to other kernel representations with two or more components.

A detailed description including mathematical derivations of features one or more embodiments are presented in "Multi-Channel Shape-Flow Kernel Descriptors for Robust Video Event Detection or Retrieval", published in *Proceedings, Part II, of the 12th European Conference on Computer Vision* (*ECCV*) 2012, pages 301-314, (ISBN 978-3-642-33708-6), the contents of which are incorporated herein by reference.

In this example, the similarity computation is specified by a set of kernels, in this example, two kernels are defined in terms of:

$$k_p(z,z') = \exp(-\gamma_p \|z-z'\|^2)$$

and $$k_o(\tilde{\theta}_z, \tilde{\theta}_{z'}) = \exp(-\gamma_o \|\tilde{\theta}(z) - \tilde{\theta}(z')\|^2).$$

A desired similarity between patches is computed as $$K_{grad}(P, Q) = \sum_{z \in P} \sum_{z' \in Q} \tilde{m}(z)\tilde{m}(z') k_o(\tilde{\theta}_z, \tilde{\theta}_{z'}) k_p(z, z')$$

where the sum over $z \in P$ is a sum over the pixel locations z in the patch P and the sum over $z' \in Q$ is a sum over the pixel locations z' in the patch Q.

A desired property of $K_{grad}$ is the ability to decompose it to a dot product of feature vectors $F_{grad}(P)$ and $F_{grad}(Q)$ computed independently on patches P and Q:

$$K_{grad}(P,Q) = F_{grad}(P) \cdot F_{grad}(Q)$$

However, each of these vectors $F_{grad}$ can potentially be infinite dimensional depending on the kernels (such as $k_p$, $k_o$). This is addressed using an approximation that projects $F_{grad}$ to rad an orthonormal basis with a limited number (e.g., $1 \leq t \leq T$) of basis vectors. Therefore, the finite dimensional approximation of the kernel similarity is then $$K_{grad}(P, Q) = \sum_{t=1}^{T} F_{grad}^t(P) F_{grad}^t(Q) K_{grad}(P, Q) \approx \sum_{t=1}^{T} F_{grad}^t(P) F_{grad}^t(Q)$$

So an important computation is the computation of the T scalars $F_{grad}^t(P)$ for each patch P.

One way to compute this scalar is as a doubly index sum $$F_{grad}^t(P) = \sum_{i=1}^{d_o} \sum_{j=1}^{d_p} \alpha_{ij}^t \left\{ \sum_{z \in P} \tilde{m}(z) k_o(\tilde{\theta}(z), x_i) k_p(z, y_j) \right\}$$

where $\{x_i\}$ and $\{y_j\}$ are preselected basis sets for the arguments of the kernel functions. For example, the set $\{x_i\}$ may represent $d_o = 25$ angles between 0 and $2\pi$ and the $\{y_j\}$ may represent $d_p = 25$ 2D positions in a unit 5×5 square. In such an example, the double summation requires $d_o \times d_p = 625$ evaluations of the innermost term for each pixel of P.

The scalars $\alpha_{ij}^t$ can be represented as (column) vectors $\alpha^t = [\alpha_{ij}^t]$ of dimension $d_o \times d_p = 625$. Furthermore, each $\alpha^t$ is an eigenvector of a matrix defined as the Kronecker product $$K_{o,c} \otimes K_{p,c}$$

where $K_{o,c}$ and $K_{p,c}$ denote the centered orientation and position kernel matrices corresponding to $K_o$ and $K_p$, respectively, and the elements of the kernel matrices are defined as $$K_o = [K_{o,ij}] \text{ and } K_p = [K_{p,ij}]$$

where $$K_{o,ij} = k_o(x_i, x_j) \, K_{p,st} = k_p(y_s, y_t).$$

Recognizing that the $\alpha^t$ are eigenvectors of a Kronecker product, these eigenvectors can be computed from the eigenvectors of the matrices that make up the products such that $$\alpha_{ij}^t = \alpha_{o,i}^t \alpha_{p,j}^t$$

where $\alpha_o^t = [\alpha_{o,i}^t]$ is a ($d_o$ dimensional) eigenvenvector of $K_o = [K_{o,ij}]$ and $\alpha_p^t = [\alpha_{p,j}^t]$ is a ($d_p$ dimensional) eigenvenvector of $K_p = [K_{p,st}]$, and the corresponding eigenvalue $\lambda^t = \lambda_o^t \lambda_p^t$.

Recognizing that the terms $\alpha_{ij}^t$ can be separated as shown above, computation of an entry of the $F_{grad}(P)$ vector can be rewritten as $$F_{grad}^t(P) = \sum_{i=1}^{d_o} \sum_{j=1}^{d_p} \alpha_{o,i}^t \alpha_{p,j}^t \left\{ \sum_{z \in P} \tilde{m}(z) k_o(\tilde{\theta}(z), x_i) k_p(z, y_j) \right\}$$

which can be rearranged as $$F_{grad}^t(P) = \sum_{z \in P} \tilde{m}(z) \left\{ \sum_{i=1}^{d_o} \alpha_{o,i}^t k_o(\tilde{\theta}(z), x_i) \right\} \left\{ \sum_{j=1}^{d_p} \alpha_{p,j}^t k_p(z, y_j) \right\}$$

and the terms in brackets can be replaced with precomputed functions $$F_{grad}^t(P) = \sum_{z \in P} \tilde{m}(z) T_o^t(\theta(z)) T_p^t(z)$$

where $$T_o^t(\theta(z)) = \left\{ \sum_{i=1}^{d_o} \alpha_{o,i}^t k_o(\tilde{\theta}(z), x_i) \right\}$$

and $$T_p^t(z) = \left\{ \sum_{j=1}^{d_p} \alpha_{p,j}^t k_p(z, y_j) \right\}.$$

Note that if the set of possible values $z \in P$ and possible values $\tilde{\theta}(z)$ are known, the values of the precomputed functions could be enumerated in advance. Without knowing the set of possible values, a quantization of the possible values $q_o(\tilde{\theta}(z))$ into a finely space set $\{q_{o,i}\}_{i=1,\ldots,N_o}$ and $q_p(z)$ into a finely spaces set $\{q_{p,j}\}_{j=1,\ldots,N_p}$ is used such that $$T_o^t(\tilde{\theta}(z)) \sim T_o^t(q_o(\tilde{\theta}(z)))$$

and $$T_p^t(z) \sim T_p^t(q_p(z))$$

A kernel preprocessor 120 is used to precompute a kernel table $T_o[\theta]$ of size $T \times N_o$ and $T_p[z]$ of size $T \times N_p$ using the approach outlined above, generally before beginning processing of the input video.

At runtime the kernel similarity computation element 140 reads the precomputed tables, and uses them to compute (i.e., approximate via the tables, either by direct lookup or an interpolation) the T dimensional vectors $F_{grad}(P)$ and $F_{grad}(Q)$ from which the similarity $K_{grad}(P,Q)$ 142 is obtained by computing the inner product as described above.

The description below provides an example of feature representation and early and late fusion techniques. In this example, a "bag-of-words" framework is used to represent the information from different feature descriptors. This is done in two steps—in the first coding step the descriptors are projected to a pre-trained codebook of descriptor vectors, and then in the pooling step the projections are aggregated to a fixed length feature vector. We use both spatial and spatio-temporal pooling. From these features, we further employ kernel based fusion and score level fusion to achieve more robust performance.

Formally, we represent a video by a set of low-level descriptors, $x_i$, where $\{1 \ldots\}$ is the set of locations. Let M denote the different spatial/spatio-temporal regions of interest, and $N_m$ denote the number of descriptors extracted within region m. Let f and g denote the coding and pooling operators respectively. Then, the vector z representing the entire video is obtained by sequentially coding and pooling over all regions and concatenating:

$$\alpha_i = f(x_i), i=1 \ldots N$$

$$h_m = g(\{\alpha_i\}_{i \in N_m}), m=1, \ldots, M$$

$$z^T = [h_1^T \ldots h_M^T]$$

For the coding step, we first learn a codebook using k-means or a similar unsupervised clustering algorithm from a sample set of feature vectors. In hard quantization, we assign each feature vector $x_i$ to the nearest codeword from the codebook as $$\alpha_i \in \{0, 1\}^K,$$

$$\alpha_{i,j} = 1 \Leftrightarrow j = \underset{k \leq K}{\operatorname{argmin}} \|x_i - c_k\|^2$$

where $c_k$ is the $k^{th}$ codeword. In soft quantization, the assignment of the feature vectors to codewords is distributed as $$\alpha_{i,j} = \frac{\exp(-\beta \|x_i - c_j\|^2)}{\sum_{k=1}^{K} \exp(-\beta \|x_i - c_k\|^2)}$$

where $\beta$ controls the soft assignment. In our experiments we find soft quantization to consistently outperform hard quantization.

Two popular pooling strategies are average and max. In average pooling, we take the average of the $\alpha_i$ assigned to different codewords for different feature vectors as $h=1/N \Sigma_{i=1}^{N} \alpha_i$. In max pooling, we take the maximum of the $\alpha_i$'s as $h = \max_{i=1 \ldots N} \alpha_i$. In this example, we find average pooling to consistently outperform max pooling for video retrieval. Further spatial pooling with $1 \times 1 + 2 \times 2 + 1 \times 3$ partition of the (x,y) space has consistently superior performance for all the features considered.

We combine multiple features in an early fusion framework by using p-norm Multiple Kernel Learning (MKL), with p>1. For each feature, we first compute exponential $\chi^2$ kernels, defined by $$K(x, y) = e^{-\rho \sum_i \frac{(x_i - y_i)^2}{x_i + y_i}}$$

for each pair of samples x and y in the training set. Then, given a set of kernels $\{K_k\}$ for individual features, we learn a linear combination $K = \Sigma_k d_k K_k$ of the base kernels. The primal of this problem can be formulated as $$\min_{w,b,\xi\geq 0,d\geq 0} \frac{1}{2}\sum_k w_k^t w_k + C\sum \xi_i + \frac{\lambda}{2}\left(\sum_k d_k^p\right)^{\frac{2}{p}}$$

$$\text{s.t. } y_i\left(\sum_k \sqrt{d_k}\, w_k^t \phi_k(x_i) + b\right) \geq 1 - \xi_i$$

The convex form of the above equation is obtained by substituting $w_k$ for $\sqrt{d_k}w_k$. To solve this equation efficiently, we use Sequential Minimal Optimization (SMO). This is possible by first computing the Lagrangian $$L = \frac{1}{2}\sum_k w_k^t w_k/d_k + \sum (C-\beta_i)\xi_i + \frac{\lambda}{2}\left(\sum_k d_k^p\right)^{\frac{2}{p}}$$
$$- \sum_i \alpha_i\left[y_i\left(\sum_k w_k^t \phi_k(x_i) + b\right) - 1 + \xi_i\right]$$

and then computing the $l_p$-MKL dual as $$D = \max_{\alpha \in A} 1^t\alpha - \frac{1}{8\lambda}\left(\sum_k (\alpha^t H_k \alpha)^q\right)^{\frac{2}{q}}$$

where $$\frac{1}{p} + \frac{1}{q} = 1,$$

A={α|0≤α≤C1,1'Yα=0}, $H_k$=Y$K_k$Y, and Y is a diagonal matrix with labels on the diagonal. The kernel weights can then be computed as $$d_k = \frac{1}{2\lambda}\left(\sum_k (\alpha^t H_k \alpha)^q\right)^{\frac{1}{q}-\frac{1}{p}} (\alpha^t H_k \alpha)^{\frac{q}{p}}$$

Since the dual objective above is differentiable with respect to α, the SMO algorithm can be applied by selecting two variables at a time and optimizing until convergence.

We adopted a weighted average fusion strategy that assigns video specific weights based on each system's detection threshold. This is based on the intuition that a system has low confidence when its score for a particular video is close to the detection threshold, and high confidence when the scores are significantly different from the threshold. Given the confidence score $p_i$ from system i for a particular video, the weight for that system and video is computed as:

$$w_i = \begin{cases} \frac{Th_i - p_i}{Th_i} & \text{if } p_i < Th_i \\ \frac{p_i - Th_i}{1 - Th_i} & \text{else} \end{cases}$$

where $Th_i$ is the detection threshold. The final score P for a video is computed as $P = \Sigma_i w_i p_i / \Sigma_i w_i$. In our experiments, this approach consistently improved performance over any individual system.

A number of different implementations of the runtime and preprocessing systems may be used, for example, using software, special-purpose hardware, or a combination of software and hardware. In some examples, computation of the kernel tables is performed using a general-purpose computer executing software stored on a tangible non-transitory medium (e.g., magnetic or optical disk). The software can include instructions (e.g., machine level instructions or higher level language statements). In some implementations, the kernel similarity computation is implemented using special-purpose hardware and/or using a co-processor to a general purpose computer. The kernel tables, which may be passed to the runtime system and/or stored on a tangible medium, should be considered to comprise software which imparts functionality to the kernel similarity computation (hardware and/or software-implemented) element. In some implementations, the kernel tables are integrated into a configured or configurable circuit, for example, being stored in a volatile or non-volatile memory of the circuit.

It is to be understood that the foregoing description is intended to illustrate and not to limit the scope of the invention, which is defined by the scope of the appended claims. Other embodiments are within the scope of the following claims.

What is claimed is:

1. A method for processing images in a video processing system comprising:
   accepting a video signal having a series of images acquired by a camera for processing and identifying a plurality of patches within said images;
   reading a plurality of stored kernel tables, each kernel table representing a mapping from a corresponding feature to a vector of values;
   computing a feature vector F(P) for each patch P of the plurality of patches, including computing one or more summations over locations z in the patch P of terms, each term being a product of terms including a term obtained by a lookup in a corresponding kernel table according to the location z and/or an attribute of the patch P at the location z; and
   processing the images according to the computed feature vectors for the plurality of patches to provide a video processor output.

2. The method of claim 1 wherein F(P) approximates kernel descriptor based on a plurality of kernels.

3. The method of claim 2 wherein F(P) equals or approximates a sum of a form $$\sum_i \sum_j \alpha_{ij}\left\{\sum_{z \in P} M(z)A(z, x_i)B(z, y_i)\right\}$$

where $\alpha_{ij}$ is a vector, and the summation used to compute F(P) represents a computation equivalent to $$F(P) = \sum_{z \in P} M(z)T_A(z)T_B(z)$$

where $T_A$ and $T_B$ are vectors multiplied elementwise and are determined by lookup from the kernel tables.

4. The method of claim 1 wherein processing the images comprises computing similarities between patches as combinations of the computed feature vectors for the patches.

5. The method of claim 1 wherein the images are frames of a video, and wherein at least some of the patches are formed from multiple frames.

6. A method for image processing in a video processing system comprising:
   accepting an input video having a series of images acquired by a camera for processing, and identifying patches within said images;
   reading a plurality of stored kernel tables, each kernel table representing a mapping from a corresponding feature to a vector of values;
   repeatedly computing similarities between pairs of patches for images being processed, computation of a similarity between a patch P and a patch Q comprises
      computing for patch P one or more summations over locations z in the patch P of terms, each term being a product of terms including a term obtained by a lookup in a corresponding kernel table according to the location z and/or an attribute of the patch P at the location z,
      computing for patch Q one or more summations over locations z in the patch Q of terms, each term being a product of terms including a term obtained by a lookup in a corresponding kernel table according to the location z and/or an attribute of the patch Q at the location z, and
      combining the sums of the one or more summations for P and one or more summations for Q to determine a kernel descriptor similarity between P and Q; and
   providing a video processor output comprising a result of processing the images using the computed similarities between the patches.

7. The method of claim 6 further comprising precomputing the kernel tables prior to accepting the images for processing.

8. A video processing system comprising:
   a kernel preprocessor to provide a plurality of stored kernel tables, each kernel table representing a mapping from a corresponding feature to a vector of values;
   an input to accept an input video having a series of images acquired by a camera for processing, and identifying a plurality of patches within said images;
   a similarity computation module to compute a feature vector F(P) for each patch P of the plurality of patches, including computing one or more summations over locations z in the patch P of terms, each term being a product of terms including a term obtained by a lookup in a corresponding kernel table according to the location z and/or an attribute of the patch P at the location z; and
   process the images according to the computed feature vectors for the plurality of patches; and
   an output to provide a video processor output resulting from processing the images.

9. Software stored on a non-transitory computer-readable medium comprising instructions for causing a processor to:
   accept a video input having a series of images acquired by a camera for processing, and identifying patches within said images;
   read a plurality of stored kernel tables, each kernel table representing a mapping from a corresponding feature to a vector of values;
   repeatedly compute similarities between pairs of patches for images being processed, computation of a similarity between a patch P and a patch Q comprises
      computing for patch P one or more summations over locations z in the patch P of terms, each term being a product of terms including a term obtained by a lookup in a corresponding kernel table according to the location z and/or an attribute of the patch P at the location z,
      computing for patch Q one or more summations over locations z in the patch Q of terms, each term being a product of terms including a term obtained by a lookup in a corresponding kernel table according to the location z and/or an attribute of the patch Q at the location z, and
      combining the sums of the one or more summations for P and one or more summations for Q to determine a kernel descriptor similarity between P and Q; and
   provide a video processor output comprising a result of processing the images using the computed similarities between the patches.

* * * * *